US008657008B2

(12) United States Patent
Harris et al.

(10) Patent No.: US 8,657,008 B2
(45) Date of Patent: Feb. 25, 2014

(54) PROCESS FOR TREATING UNDERGROUND FORMATIONS

(75) Inventors: Ralph Edmund Harris, Guildford (GB); Ian Donald Mckay, Guildford (GB)

(73) Assignee: Cleansorb Limited, Guildford Surrey (GB)

( * ) Notice: Subject to any disclaimer, the term of this patent is extended or adjusted under 35 U.S.C. 154(b) by 109 days.

(21) Appl. No.: 10/594,568

(22) PCT Filed: Mar. 24, 2005

(86) PCT No.: PCT/GB2005/001187
§ 371 (c)(1),
(2), (4) Date: Nov. 1, 2006

(87) PCT Pub. No.: WO2005/095755
PCT Pub. Date: Oct. 13, 2005

(65) Prior Publication Data
US 2008/0017382 A1 Jan. 24, 2008

(30) Foreign Application Priority Data
Mar. 27, 2004 (GB) .................................. 0406993.6

(51) Int. Cl.
*E21B 37/08* (2006.01)

(52) U.S. Cl.
USPC ........................ 166/312; 166/305.1; 166/307

(58) Field of Classification Search
None
See application file for complete search history.

(56) References Cited

U.S. PATENT DOCUMENTS

| | | | |
|---|---|---|---|
| 3,630,285 A | 12/1971 | Claytor, Jr. et al. | |
| 3,741,308 A | 6/1973 | Veley | |
| 3,974,082 A | 8/1976 | Weyn | |
| 4,387,769 A | 6/1983 | Erbstoesser et al. | |
| 4,957,165 A | 9/1990 | Cantu et al. | |
| 4,986,353 A | 1/1991 | Clark et al. | |
| 4,986,355 A | 1/1991 | Casad et al. | |
| 5,108,457 A | 4/1992 | Poulose et al. | |
| 5,164,099 A | 11/1992 | Gupta et al. | |
| 5,278,256 A | 1/1994 | Bellis et al. | |
| 5,296,161 A | 3/1994 | Wiersema et al. | |
| 5,338,474 A | 8/1994 | Kaiserman et al. | |
| 5,352,594 A | 10/1994 | Poulouse | |
| 5,364,554 A | 11/1994 | Stanislowski et al. | |
| 5,678,632 A | 10/1997 | Moses et al. | |
| 6,140,277 A | 10/2000 | Tibbles et al. | |
| 6,283,205 B1 | 9/2001 | Cannon | |
| 6,394,185 B1 * | 5/2002 | Constien ....................... | 166/296 |
| 6,488,091 B1 | 12/2002 | Weaver et al. | |
| 6,533,034 B1 | 3/2003 | Barger | |
| 6,702,023 B1 | 3/2004 | Harris et al. | |
| 6,763,888 B1 | 7/2004 | Harris et al. | |
| 6,817,414 B2 * | 11/2004 | Lee ................................. | 166/278 |
| 6,831,044 B2 * | 12/2004 | Constien ........................ | 507/201 |
| 7,080,688 B2 * | 7/2006 | Todd et al. .................... | 166/278 |
| 7,166,560 B2 * | 1/2007 | Still et al. ...................... | 507/219 |
| 7,195,068 B2 * | 3/2007 | Todd .............................. | 166/300 |
| 7,204,316 B2 | 4/2007 | Dusterhoft et al. | |
| 7,216,705 B2 | 5/2007 | Saini et al. | |
| 7,265,079 B2 * | 9/2007 | Willberg et al. .............. | 507/203 |
| 7,431,088 B2 | 10/2008 | Moorehead et al. | |
| 7,461,699 B2 | 12/2008 | Richard et al. | |
| 2002/0142919 A1 * | 10/2002 | Constien ........................ | 507/100 |
| 2003/0060374 A1 | 3/2003 | Cooke, Jr. | |
| 2003/0114539 A1 | 6/2003 | Weaver et al. | |
| 2004/0018943 A1 | 1/2004 | Pyecroft et al. | |
| 2004/0106525 A1 | 6/2004 | Willberg et al. | |
| 2004/0152601 A1 | 8/2004 | Still et al. | |
| 2004/0214724 A1 | 10/2004 | Todd et al. | |
| 2004/0231845 A1 | 11/2004 | Cooke, Jr. | |
| 2005/0034861 A1 | 2/2005 | Saini et al. | |
| 2005/0034865 A1 | 2/2005 | Todd et al. | |
| 2005/0034868 A1 | 2/2005 | Frost et al. | |
| 2005/0045328 A1 | 3/2005 | Frost et al. | |
| 2005/0137094 A1 | 6/2005 | Weaver et al. | |
| 2006/0016596 A1 | 1/2006 | Pauls et al. | |
| 2006/0105917 A1 | 5/2006 | Munoz, Jr. | |
| 2006/0105918 A1 | 5/2006 | Munoz, Jr. | |
| 2006/0205608 A1 | 9/2006 | Todd | |
| 2006/0283597 A1 | 12/2006 | Schriener et al. | |
| 2007/0123433 A1 | 5/2007 | Sarkar et al. | |
| 2009/0062157 A1 | 3/2009 | Munoz, Jr. et al. | |

FOREIGN PATENT DOCUMENTS

| | | | |
|---|---|---|---|
| EP | 1 441 104 A | 7/2004 | |
| WO | 00/57022 A | 9/2000 | |
| WO | WO01/02698 * | 1/2001 | ............. E21B 37/06 |
| WO | WO 2004/037946 A1 | 6/2004 | |
| WO | WO 2008/068660 A2 | 6/2008 | |
| WO | WO 2008/072128 A2 | 6/2008 | |

OTHER PUBLICATIONS

International Search Report of PCT/GB2005/001187, mailed Jul. 27, 2005.

* cited by examiner

*Primary Examiner* — Angela M DiTrani
(74) *Attorney, Agent, or Firm* — Nixon & Vanderhye P.C.

(57) ABSTRACT

A process for disrupting filter cake in an underground formation, which process comprises:
(i) incorporating into a treatment fluid a solid polymer capable of being converted by hydrolysis into one or more organic acids;
(ii) introducing the treatment fluid into the underground formation; and
(iii) allowing the solid polymer to hydrolyse in the presence of water to produce organic acid such that acid soluble material within the filter cake or adjacent formation is dissolved.

23 Claims, No Drawings

PROCESS FOR TREATING UNDERGROUND FORMATIONS

This application is the US national phase of international application PCT/GB2005/001187, filed 24 Mar. 2005, which designated the U.S. and claims priority of GB 0406993.6, filed 27 Mar. 2004, the entire contents of each of which are hereby incorporated by reference.

The present invention relates to the optimization and enhancement of the production of oil, gas or water from wells drilled into underground formations. More particularly the invention relates to the disruption, especially the degradation and removal, of filter cake in underground formations, including the removal of filter cake in gravel pack and other sand control completions.

The effective removal of formation damage, especially near wellbore damage such as filter cake, can significantly increase the production rate of hydrocarbon or water from wells penetrating underground formations. The effective removal of damage can also increase the injectivity of injection wells.

The production rate of an oil, gas or water well following drilling and workover operations is often limited due to the presence of filter cakes generated during the operations. The filter cake must be removed in order to maximise production. In high permeability formations, there may be sufficient draw down from fluid production to lift off the filter cake and restore formation permeability. Generally however, it is necessary to apply a chemical treatment to remove the filter cake. Conventional treatments for removing filtercake include the use of aqueous solutions of an oxidiser, hydrochloric acid solutions, organic acid solutions including formic or acetic acid, combinations of acid and oxidiser, and aqueous solutions of enzymes which are introduced into the formation after the drilling or workover.

U.S. Pat. No. 6,140,277 and PCT/GB00/01032 detail the problems which affect conventional techniques of filtercake removal. The effective placement of reactive fluids such as hydrochloric acid is very difficult and generally results in very variable effectiveness of treatment along the wellbore or other target zone. Placement problems have been addressed by methods which generate acid in-situ (U.S. Pat. No. 5,678,632; PCT/GB00/01032).

Another problem is that filter cakes frequently consist of several components which are generally not treatable by a single treatment. For example, certain drilling muds or drill-in fluids contain calcium carbonate or dolomite in combination with a polymer or polymers which provides suitable rheological properties. Both the carbonate and the polymer contribute to the formation of a filter cake. Rock fines generated during drilling of the formation rocks may also be present in the filter cakes.

An acid may be used to dissolve the carbonate components of filter cakes and suitable breakers such as oxidizing agents or enzymes may be used to break down polymers in the filter cake. These have generally been applied as separate treatments as acids and polymer breakers are frequently incompatible (U.S. Pat. No. 6,140,277; PCT/GB00/01032).

U.S. Pat. No. 6,140,277 teaches the use of formulations comprising a viscoelastic surfactant, a chelating agent and an enzyme for breaking a filter cake.

PCT/GB00/01032 teaches the use of formulations comprising esters which hydrolyse (optionally using ester hydrolysing enzymes) to produce organic acid in-situ in combination with oxidants or enzyme polymer breakers to treat formation damage including filter cakes.

Both U.S. Pat. No. 6,140,277 and PCT/GB00/01032 allow single stage treatments of filter cakes wherein the treatment dissolves carbonate and hydrolyses polymers.

In addition to treatment fluid placement problems and the problems of treating more than one component in filter cakes, additional problems arise in removing filter cakes during sand control completions.

Sand control is often required when producing oil gas or water from sandstone formations. A large proportion of hydrocarbon production worldwide is from underground sandstone formations. These formations often have a high porosity and permeability so have the potential to produce hydrocarbons at high rates. Frequently however, such formations have a tendency to produce sand, due to being unconsolidated or poorly consolidated. Sand as used herein refers to fine particulate materials which may be produced from poorly consolidated sandstones. Normally these will be sand grains. Poorly consolidated sandstones have been suitably defined in U.S. Pat. No. 3,741,308. Sand producing formations generally are relatively young in the sense of geological time and are simply composed of loosely attached sand or sediments that have not yet been converted to solid sandstone by geochemical methods.

Factors which cause sand production in weak formations include producing drawdown, pressure depletion, in-situ rock stresses, changes in flow rate or changes in water cut (sand production is often associated with water breakthrough). While a certain amount of sand production can be tolerated, excessive sand production can cause a variety of operational problems including erosion of pumps, tubing, chokes, valves and pipe bends. This can lead to serious safety and environmental consequences (U.S. Pat. No. 3,741,308). It can also lead to collapse of the formation or casing and significant reduction in or loss of production.

It is therefore normal practice to seek to put sand control measures in place in wells drilled into formations which are expected to produce sand. The tendency of the formation to produce sand is indicated by the unconfined compressive strength of the formation. Generally if a formation has an unconfined compressive strength of about 1,100 p.s.i. or greater, sand production is unlikely so sand control measures are not likely to be required. At an unconfined compressive strength of between about 400 & 1,100 p.s.i. sand production may occur and sand control is normally desirable. Below an unconfined compressive strength of about 400 p.s.i. sand control is almost certainly required.

There are a number of established approaches to sand control. These include mechanical approaches which physically prevent sand from entering the produced fluids and the use of chemical methods which bind the sand grains together.

Common approaches to mechanical sand control are gravel packing and the use of pre-packed screens. Gravel packs use gravel (sized sand) placed in the wellbore and physically prevent sand from entering the production stream. A screen is used to prevent gravel production. Gravel packs may be open hole (external gravel pack) or cased hole (internal gravel pack). "Frac-packs" combine cased hole gravel pack and hydraulic fracturing completions and are generally expected to give higher productivity than straight gravel packing. Pre-packed screens are commonly used in horizontal openhole wells and typically consist of a layer of resin bonded gravel held between two screens.

The process of placing the gravel in internal and external gravel packs involves pumping a slurry of gravel suspended in a carrier fluid. To maintain circulation of this fluid and effective gravel placement for external gravel packs, particularly in long horizontal or deviated wells, drilling mud filter cake on the face of the wellbore plays an important role in preventing fluid loss and maintaining circulation. In the case of external gravel packs, it is therefore very important that the filter cake remains intact during placement of the gravel. An intact filter cake is also desirable when placing pre-packed screens, to prevent fluid loss. Avoiding fluid loss is extremely important in the case of long horizontal or deviated wells where the producing interval may be several thousand feet long.

In sand control completions, the entrapment of filter cake between the formation and screens or gravel can potentially result in a significant productivity reduction. Once gravel packing has been completed, or after pre-packed screens have been placed in the wellbore, effective removal of the filter cake is necessary to maximise production or injection rates. Society of Petroleum Engineers paper SPE 50673 describes the state of the art with respect to clean up of sand control completions in open hole horizontal wells.

U.S. Pat. No. 6,140,277 teaches that it would be highly advantageous if the fluid used to deliver the gravel could also be used to dissolve the filter cake. This would eliminate the need for a separate treatment just to dissolve the filter cake and result in substantial time and cost savings. The fluid therefore needs two contradictory attributes: the filter cake must not be degraded prematurely (before placement of the gravel pack is completed) but the fluid should eventually dissolve the filter cake.

It is not possible to add acid directly to the gravel packing fluid as this would break a filter cake very quickly leading to premature fluid leak off which would adversely affect both the gravel packing operation and the efficiency of filter cake treatment along the remainder of the wellbore.

U.S. Pat. No. 6,140,277 teaches that there is an urgent need in the drilling and completions sector for a reliable fluid for degrading filtercake quickly, efficiently and completely and which can be used as a carrier fluid in conjunction with other completion, workover or stimulation operations. U.S. Pat. No. 6,140,277 further teaches the use of a formulation containing a viscoelastic surfactant, chelating agent and enzyme to place gravel and dissolve filter cake.

In addition to the effective clean up of filter cakes in openhole gravel packs, it is also desirable to keep the screens used in sand control completions as clean as possible during placement in the underground formation and during subsequent well construction operations. This is difficult in inclined, deviated or horizontal wellbores as the equipment may lie against the wall of the wellbore and drilling mud, formation fines and other undesirable materials may be forced into the screen. Effective clean up of the screens may be very difficult. Other downhole production equipment may also be damaged by particulate material which enters regions of the equipment which should be kept clean. Use of centralisers or functionally equivalent means of preventing the equipment contacting the wellbore may assist in keeping the equipment clean.

The object of the present invention is to provide an alternative process for disrupting, for instance degrading, a filter cake present in an underground formation.

A further object of the present invention is to provide a process for degrading a filter cake in gravel packing and other sand control operations.

Another object of the present invention is to provide a process of degrading a filter cake in which the rate of degradation of the filter cake is controlled and is highly predictable.

It is an additional object of the present invention to provide a process of degrading a filter cake which is environmentally acceptable by utilising components which are of low environmental impact.

Another object of the present invention is to provide means of preventing damage to screens and other downhole equipment during placement in the underground formation.

Accordingly, the present invention provides a process for disrupting filter cake in an underground formation, which process comprises:
a) incorporating into a treatment fluid a solid polymer capable of being converted by hydrolysis into one or more organic acids;
b) introducing the treatment fluid into the underground formation; and
c) allowing the solid polymer to hydrolyse in the presence of water to produce organic acid such that acid soluble material within the filter cake or adjacent formation is dissolved.

The invention also provides the use of a solid polymer, which is capable of being converted by hydrolysis into one or more organic acids, as a filter cake disrupting agent in an underground formation treatment fluid.

The process of the present invention may be used to treat formation damage present within the wellbore or adjacent parts of the underground formation. In particular it may be used to treat, and thereby disrupt, degrade or remove altogether, filter cakes which arise from drilling or workover operations.

A well is drilled to the underground formation to be treated. The well is generally an openhole completion wherein the inside of the wellbore is lined with a filter cake. The filter cake normally needs to be at least partly removed to allow the well to produce at high rates. Casing and perforating of a well will generally bypass formation damage caused by filter cakes so the process of the present invention is not normally applicable to such wells, unless there is formation damage amenable to treatment using formulations of the present invention.

The well bore serves as a convenient means for introducing the treatment fluid into the formation by any method known to those skilled in the art including via the drillstring (in which case the mud pumps may be used), coiled tubing or bullheading of the fluid.

The polymer used in the process of the present invention is any solid polymer which hydrolyses in the presence of water to generate an organic acid or acids. Preferably the polymer is a polyester, most preferably an aliphatic polyester selected from the group which can be synthesised by suitable processes known to those skilled in the art, including the ring opening melt condensation of lactide (lactic acid cyclic dimer), glycolide (glycolic acid cyclic dimer) and caprolactone. Suitable polymers include polylactide (polylactic acid) polyglycolide (polyglycolic acid) lactide-glycolide copolymer, lactide-caprolactone copolymer, glycolide-caprolactone copolymer or lactide-glycolide-caprolactone copolymer.

Hydrolysis of a polymer produced from the condensation of lactide produces lactic acid and hydrolysis of a polymer produced from the condensation of glycolide produces glycolic acid. Lactic acid and glycolic acid (hydroxyacetic) acid are the preferred acids produced by hydrolysis of the polymer used in the process of the present invention. Suitable polymers also include homopolymers or copolymers of lactic acid and hydroxyacetic acid (glycolic acid) and copolymers of lactic acid and/or glycolic acid with one or more other compounds containing hydroxy-, carboxylic- or hydroxycarboxylic acid moieties. U.S. Pat. No. 4,986,353 provides examples of suitable monomers with which lactic acid or glycolic acid may be condensed. Suitable monomers include but are not limited to tribasic acids such as citric acid, dibasic acids such as adipic acid, and diols such as ethylene glycol and polyols. They also include difunctional molecules such as 2,2-(bishydroxymethyl)propanoic acid. Preferred co-condensing molecules according to the process of U.S. Pat. No. 4,986,353 are citric acid, 2,2-(bishydroxymethyl)propanoic acid, trimethylol-ethane, and adipic acid. These, or any other monomers may also be incorporated into the polymers according to the process of the present invention as long as the solid polymer undergoes hydrolysis in the presence of water to generate an organic acid or acids.

Acid production is from simple hydrolysis of ester linkages in the polyester.

Polymers which hydrolyse to produce lactic acid and/or glycolic acid are preferred. The most preferred polymers are aliphatic polyesters selected from the group which can be synthesised by the condensation of lactic acid, glycolic acid and caprolactone. The composition of the polymer or copolymer is a principal determinant of the hydrolysis rate of the polymer. A composition that will give the required rate of hydrolysis under the temperature conditions of the treated formation will generally be selected. After placement of the polymer, the well will normally be shut in for a time sufficient for the polymer to hydrolyse and produce acid and dissolve acid soluble material.

Preferably, the organic acids produced by the hydrolysis of the polymer react with calcium carbonate to form calcium salts with a solubility in water of at least a few percent at the formation temperature. Lactic acid and glycolic acid are suitable acids.

The type of organic acid, amount of acid delivered and rate of acid production at a given temperature may be determined by selecting an appropriate polymer composition and form of presentation of the solid polymer (size and shape of the solids) and the quantity of polymer in the treatment fluid.

Hydrolysis of the polymer is by bulk erosion (Biodegradable Polymers as Drug Delivery Systems, Edited by Mark Chasin and Robert Langer. Marcel Dekker Inc., New York, Basel and Hong Kong, 1990). The rate of hydrolysis is primarily influenced by four key variables; monomer stereochemistry (D or L form), comonomer ratio, polymer chain linearity and polymer molecular weight. As hydrolysis takes place at the surface of the polymer, for a given polymer composition, the particle size of the polymer is also a prime determinant of the rate of hydrolysis and acid production. Smaller particles of a polymer of a given composition at a given temperature have a larger surface area per unit weight than larger particles so will produce acid at a faster rate. In general, polylactic acid and other lactic acid rich polymers will degrade at a slower rate than polyglycolic acid and glycolic acid rich polymers. Incorporation of caprolactone into the polymers can further increase the rate of hydrolysis of the polymers. The rate of hydrolysis of the polymers may also be influenced by the extent of block or random structure in copolymers, by chemical modification of the end groups of the polymer or by the introduction of branching into the polymers, for example by incorporating polyols into the polymer.

The rate of depolymerisation may also be increased by incorporating specific chemicals such as quaternary ammonium compounds into the polyesters (U.S. Pat. No. 5,278,256). Compositions of polymer which hydrolyse relatively quickly include polyglycolic acid and polymers where glycolic acid represents over 50% of the constituent monomers of the polymer. Compositions of polymer which hydrolyse relatively slowly include polylactic acid and polymers where lactic acid represents over 50% of the constituent monomers of the polymer. In low temperatures, for example from 20° C. to 100° C., polymers rich in glycolic acid (i.e. containing over 50%) will tend to be used in the process of the present invention. At higher temperatures, for example from about 80° to 170° C. polymers rich in lactic acid (i.e. containing over 50%) will tend to be used.

Sufficient polymer is present in the treatment fluid to produce sufficient acid, when the polymer is hydrolysed, to have a substantive effect on filter cake. By substantive effect it is meant that sufficient acid is produced on the hydrolysis of the polymer to give sufficient dissolution of acid soluble material, present in or adjacent to the filter cake, to assist in disruption of the filter cake and/or the removal of damage in the underground formation. The process of the invention thereby serves to increase the permeability of the underground formation. Typically the permeability of the underground formation is substantially restored to, and may even exceed, the level it would have been without the formation of filter cake.

Disruption of filter cake in accordance with the process of the invention may be achieved, for example, by the dissolution of acid-soluble material, such as carbonate, present in the filter cake. Alternatively, or in addition, disruption of filter cake in the process of the invention may be achieved by the dissolution of acid-soluble material, for instance carbonate rock, adjacent to the filter cake. To obtain sufficient dissolution, normally several percent w/v, at least about 1 to 2% and preferably about 2 to 10% w/v of polymer is incorporated into the treatment fluid. Higher amounts may be used if it is determined that this is beneficial.

The polymer may be used in underground formations at any temperature up to at least the melting temperature of the selected polymer. For example, poly(L-)lactic acid has a melting temperature of about 173° C. and polyglycolic acid has a melting temperature of 230° C. The process may however be usefully operated at temperatures of as low as 20° C. In formations at or above the melting temperature of the selected polymer, pre-cooling of the formation by injection of a large volume of water ahead of the treatment fluid containing the polymer may optionally be employed. The cooling effects of any preflush and of the treatment fluid containing the polymer, will be taken into account in calculating the required shut-in period. Because acid is produced over a period of time, the solid material may be placed within the formation before most of the acid is produced. Acid is then delivered to the whole zone in which contact with the polymer occurs.

The polymers may be used in any solid configuration, including, but not being limited to spheres, cylinders, cuboids, fibres, powders, beads or any other configuration which can be introduced into the formation. It will preferably be used in the form of particles in the size range 1 micron to 2 mm, most preferably 10 microns to 1 mm.

Polymers of the desired size and shape may be prepared by any suitable process known to those skilled in the art including but not being limited to high sheer dispersion of the polymer melt, emulsification followed by solvent evaporation, desolvation, spray drying or grinding. Some suitable processes of producing microparticles, microspheres, microcapsules, shaped particles and fibres are reviewed in Chasin, M and Langer, R. (Eds.). Biodegradable Polymers as Drug Delivery Systems. Marcel Dekker Inc., New York, (1990). U.S. Pat. No. 4,986,355 teaches a process of preparing suitably sized polyester particles for use as a fluid loss additive or as a gel breaker in a subterranean formation.

In general it is desirable to avoid the use of chlorinated solvents in solvent based methods of producing the particles of the desired size and shape. For example methylene chloride has been used to produce micro-particles of polyesters such as polylactide for use in drug delivery applications, but significant amounts of methylene chloride may be present in the micro-particles even after drying. The presence of chlorinated solvents will reduce the otherwise excellent environmental acceptability of the polyesters. The solubility of polyesters in non-chlorinated solvents is generally limited.

The polymer particles of the present invention are introduced into the formation as a slurry or suspension with or without a suspending agent or a viscosifying agent such as borate crosslinked guar gum or any other suitable viscosifying agent. If viscosifying the treatment fluid, use of gel systems such as guar-borate which are "broken" (i.e. have their viscosity reduced) by acid produced from hydrolysis of the polymer are preferred, although specific gel breakers such as oxidants or enzymes may also be incorporated into the treatment fluid containing the polymer.

As discussed above, the rate of hydrolysis of the solid polymer may be controlled by modifying its chemical composition and/or its physical size and shape. The pH and the presence of catalysts may also affect the rate of hydrolysis.

In some embodiments of the invention the solid polymer may be used as a coating for other particles placed in the underground formation, such as gravel used in gravel packing, or may be contained within other particles placed in the underground formation, such as porous proppant materials. In these cases, acid will still be produced by the hydrolysis of the solid polymer and dissolve acid soluble materials within the underground formation. Methods of coating particles with the solid polymer or of incorporating the solid polymer into other particles will be known to those skilled in the art.

In other embodiments of the invention the solid polymer may be used as a coating for equipment placed in the underground formation. The equipment may include screens, such as gravel pack screens and prepacked screens used for sand control, or other downhole production equipment. Where used as a coating for equipment the solid polymer, while still contributing to acid production in the underground formation will also protect the surface of the equipment during placement in the formation and prevent ingress of drilling mud, formation fines and other undesirable materials into the screen, prepacked screen or other equipment.

The solid polymer may also be present within at least part of the internal spaces of the screens or production equipment. Hydrolysis of the solid polymer will again contribute to the production of acid in the underground formation but as in the case of a coating, will prevent ingress of drilling mud, formation fines and other undesirable materials into the screen, prepacked screen or other equipment.

If desired, the solid polymer may be present as both a coating and in the internal spaces of the equipment. After placement of the equipment in the underground formation the eventual complete dissolution of the solid polymer will result in the underground equipment being available in a clean state.

To assist in prevention of damage during placement of equipment in the underground formation the solid polymer may also be used in a moulded form as a centraliser to keep the equipment from contact with the side of the wellbore. For example screens may be kept in the centre of the wellbore during placement in an openhole horizontal wellbore prior to gravel packing. The eventual complete dissolution of the solid polymer will contribute to the production of acid in the underground formation.

Coating of equipment with solid polymer, placement of solid polymer within equipment and moulding of centralisers out of solid polymer may be by any method known to those skilled in the art.

Where acid production alone is enough to sufficiently dissolve acid soluble materials in the filter cake and increase formation permeability, use of a treatment fluid containing only acid producing polymer will be used. In most cases however, filter cakes will also contain polymers added to the drilling fluid as fluid loss additives and viscosifying polymers so polymer breakers will also be incorporated into the treatment fluid. These will also be introduced into the underground formation, where they serve to degrade polymeric material (such as viscosifying polymers) present within filter cakes in the formulation.

Preferred polymer breakers of the present invention are oxidative breakers (oxidants) and enzyme breakers, although any other breaker capable of at least partly degrading viscosifying polymers may also be used. Polymer breakers will generally be used at at least that concentration known to be effective by those skilled in the art. Sufficient polymer breaker is present in the treatment fluid to have a substantive effect on filter cakes containing those polymers which can be broken by the polymer breakers. By substantive effect it is meant that sufficient polymer is hydrolysed to assist in the disruption of the filter cake and the removal of near wellbore damage attributable to the presence of polymers.

Oxidative breakers used in the process of the present invention may be any one of those oxidative breakers known in the art to be useful to react with viscosifying polymers, in most cases polysaccharides, to reduce the viscosity of viscosifying polymer containing compositions or to disrupt viscosifying polymer containing filter cakes. The oxidative breaker may be present in solution or as a dispersion. Suitable compounds include peroxides, persulphates, perborates, percarbonates, perphosphates, hypochlorites, persilicates and hydrogen peroxide adducts such as urea hydrogen peroxide and magnesium peroxide.

Preferred oxidative breakers for incorporation into treatment fluids to be used in the present invention are peroxides which can decompose to generate hydrogen peroxide.

Of the oxidative breakers most preferred are percarbonates and perborates, most especially sodium percarbonate and sodium perborate.

Preferred enzyme breakers for use in the process of the present invention include those enzymes known in the art to be useful to hydrolyse viscosifying polymers and thereby to reduce the viscosity of viscosifying polymer containing compositions or of viscosifying polymer containing filter cakes. Enzyme breakers will be selected on the basis of their known ability to hydrolyse the viscosifying polymer. Normally the viscosifying polymer will be a polysaccharide and the enzyme breakers will be selected on the basis of their known ability to hydrolyse the polysaccharide components in the filter cake. Examples of suitable enzymes which may be used to break polysaccharides include enzymes which can hydrolyse starch, xanthan, cellulose, guar, scleroglucan, succinoglycan or derivatives of these polymers.

In some embodiments of the present invention the effectiveness of the incorporated oxidant breakers can be enhanced by producing more reactive oxidants. Under certain conditions, for instance when a peroxide is included in the treatment fluid, the production of hydrogen peroxide in the presence of the organic acid may result in the formation of a peracid which is a more effective oxidant than the hydrogen peroxide.

Hydrolysis of esters in the presence of hydrogen peroxide may also result in the production of peracids. Esters are known to be hydrolysed by hydrolases (EC 3) such as a lipase (EC 3.1.1.3), an esterase (EC 3.1.1.1) or a protease (EC 3.4) in the presence of hydrogen peroxide or other peroxides to form a peracid (U.S. Pat. No. 3,974,082; U.S. Pat. No. 5,108,457; U.S. Pat. No. 5,296,161; U.S. Pat. No. 5,338,474; U.S. Pat. No. 5,352,594; U.S. Pat. No. 5,364,554). Peracids produced in-situ by such enzymes have been used for bleaching applications. Peracids are more effective oxidants than peroxides, particularly in the temperature range 25 to 80° C. Accordingly, esters, ester hydrolyzing enzymes, hydrogen peroxide or hydrogen peroxide generating compounds may be incorporated into treatment fluids of the present invention. Hydrolysis of polyesters in the presence of hydrogen peroxide is also expected to generate peracids.

In some embodiments of the present invention, it may be desirable to incorporate more than one type of polymer breaker, for example an oxidant might be used in combination with an enzyme breaker in the case where two polysaccharides are present but only one is amenable to attack by an enzyme. Oxidants and enzymes may if desired also be used in the form of delayed release preparations, such as will be well known by those skilled in the art.

The solid polymer particles are introduced into the formation as a slurry or suspension with or without a viscosifying agent such as borate crosslinked guar gum or any other viscosifying agent. The use of gel systems such as guar-borate which are "broken" (i.e. have their viscosity reduced) by acid produced from hydrolysis of the polymer is preferred, although specific gel breakers such as oxidants or enzymes may also be incorporated into the treatment fluid containing the polymer and may act on other types of gels which are not broken by pH reduction.

Additional materials including chemicals, catalysts or enzymes may be incorporated into the treatment fluid by dissolution or dispersion. Such materials may additionally or instead be incorporated into the solid polymer by dissolution, dispersion or encapsulation by any method known to those skilled in the art.

The additional materials may have functional activity or activities as oilfield chemicals, including production chemicals. Examples of such functional activities include, but not limited to, activity as a gel or polymer breaker, acid, corrosion inhibitor, surfactants, scale inhibitors, chelating agent, scale dissolvers, pour point modifiers, paraffin inhibitors, asphaltene inhibitors, solvents, catalysts or bioactive agents, which may be used in the process of the present invention to assist in disruption of the filter cake or to address problems associated with hydrocarbon or water production.

In one embodiment of the process of the invention as defined above, at least a portion of the polymer remains in the underground formation and continuously releases organic acid and a production chemical during hydrocarbon production or water injection until the polymer has completely hydrolysed.

One function of the added materials is to adjust the specific gravity of the treatment fluid and solid polymer to the desired value for placement in the formation. Preferred materials for adjusting the specific gravity include water soluble alkali metal salts and other salts used for adjusting the specific gravity of oilfield brines.

Where solid polymers contain other materials by dissolution, dispersion or encapsulation, hydrolysis of the solid polymer will release the other materials. In the case of materials encapsulated in the polymer, release will generally follow acid production and in the case of dissolved or dispersed materials, release will be coincident with acid production.

Because acid is produced by the hydrolysis of the solid polymers, incorporation into the treatment fluid of chemicals which react with acid to produce desirable oxidants or other chemicals for treatment of the underground formation is convenient. Such acid reactive chemicals may be incorporated into either the treatment fluid, the solid polymer component of the fluid, or both. Examples of suitable chemicals are calcium peroxide and ammonium bifluoride. Calcium peroxide decomposes in the presence of acid to form hydrogen peroxide and ammonium bifluoride decomposes in the presence of acid to form hydrogen fluoride. Production of hydrogen fluoride permits the dissolution of materials which are not readily soluble in organic acids solutions.

More than one polymer with or without encapsulated, dissolved or dispersed other materials, chemicals, catalysts or enzymes may be introduced into the formation at the same time. For example, a fast dissolving polymer may be selected to give relatively rapid acid production. This may be used in combination with another slow dissolving polymer containing a well treatment chemical such as a scale inhibitor to give controlled release of the well treatment chemical during subsequent production operations. The eventual complete dissolution of the solid polymers allows ideal clean up behavior.

All chemicals required for the process of the present invention will normally be technical grade to reduce the cost of the process.

Where an enzyme is used as a polymer breaker according to the process of the present invention, it is necessary to select an enzyme which remains active under reservoir conditions and in the treatment fluid for at least as long as the catalytic activity is needed.

The enzyme is generally a water soluble enzyme. It is generally advantageous for the enzymes to be readily water soluble although the enzymes may also be active and be used in low water activity environments or two-phase systems such as emulsions or dispersions. Typically, isolated enzymes are used. Enzymes may be isolated from plant, animal, bacterial or fungal sources. The enzymes may be produced from wild-type, conventionally bred, mutated or genetically engineered organisms. The enzymes may, optionally, be chemically modified, as long as they retain or possess the desired catalytic ability. Preferably, the enzymes will be industrial enzymes available in bulk from commercial sources.

Where it is desired to treat filter cake during gravel packing operations the solid polymer and optionally polymer breakers of the present invention will be incorporated into the carrier fluid for the gravel pack.

Where desired, the viscosity of the solution will be adjusted to the chosen value using viscosifying polymers or viscosifying surfactants with the characteristics required for gravel packing operations.

Suitable sizes and ratios of gravel and solid polymer will be selected to give the desired packing in the gravel pack and to produce the desired amount of acid. The solid polymer may be used at any concentration which will result in subsequent removal of as least a portion of the acid soluble material in the filter cake. Suitable sizes and ratios will be known to or may be readily determined by those skilled in the art.

The gravel packing fluid, containing gravel and solid polymer and optionally polymer breakers may be prepared and placed in the formation by any method of gravel packing such as is well known to those skilled in the art.

The polymer will become distributed throughout the gravel pack and acid will be delivered to the whole volume of the gravel pack, including that portion in the immediate proximity of the filter cake lining the wellbore. Polymer breakers, if optionally incorporated will also be delivered to the whole volume of the gravel pack.

Although most of the acid is produced from hydrolysis of the solid polymer after placement of the solid polymer in the underground formation, traces of acid present in the treatment fluid could potentially lead to premature dissolution of the filtercake. This could prove to be a particular problem in situations where large volumes of fluid may be in contact with relatively small areas of filter cake, for example during the gravel packing of long horizontal wells where a large volume of even a very dilute acid could lead to premature erosion of a portion of the filter cake leading to fluid leak off, lost circulation and failure of the gravel pack. This situation can be avoided by incorporation into the treatment fluids and gravel packing fluids according to the present invention of a suitable amount of a buffer, such as for example an alkaline borate buffer, which would maintain the pH at a level above that at which erosion of the filter cake would occur for at least the period of time required to complete the gravel pack.

Similarly, premature dissolution of filter cake due to polymer breakers attacking the filter cake may be addressed by using controlled release preparations of polymer breaker such as will be known to those skilled in the art, including, but not being limited to, preparations wherein the polymer breaker is incorporated into the solid polymer by encapsulation, dissolution or dispersion.

The treatment fluid is normally prepared by dissolving or dispersing the solid polymer and polymer breaker in suitable water for example city (drinking) water, produced water or sea water. If it is preferred, the treatment fluid may be prepared by adding the individual components to water on a continuous, preferably carefully controlled and monitored basis as the fluid is injected into the underground reservoir. Other methods of preparing the treatment fluid will be well known to those skilled in the art. A single solution or dispersion containing all of the components is preferably used.

The concentrations of solid polymer and polymer breakers present in the treatment fluid will depend on the amounts of acid and breaker required to disrupt the filter cake. Typically, sufficient solid polymer to produce between 0.5% and 10% w/v organic acid when fully hydrolysed will be used. Enzyme polymer breakers are typically used at 0.05% to 5% v/v of liquid preparations or the equivalent amount of dry enzyme preparation. Amounts of oxidative breaker used will depend on the type of breaker employed but will be of the order of 0.005 to 60 Kg/m3, preferably 0.2 to 10 Kg/m3.

For near wellbore treatments, the volume of treatment fluid introduced into the formation will typically be at least equal to the wellbore volume plus an allowance for some leak off into the formation. A fluid volume of between 120% and 200% of the wellbore volume will normally be used although if a high rate of fluid loss is expected a volume up to 300% or higher of the well bore volume may be selected. For gravel packing and frac-pack treatments a volume of fluid appropriate to the needs of the treatment will be used and will be readily determined by those skilled in the art. The solid polymer will normally be of a size that will not penetrate far into the formation so will be retained within, and produce acid within, the wellbore, gravel pack, frac-pack or fracture.

The treatment fluid needs to be shut in for a period long enough for the desired amount of acid to be produced by hydrolysis of the solid polymer, for the acid produced to dissolve acid soluble materials, and for any polymer breakers present to break the polymers. Normally it is desirable for the treatment to be completed within 1 to 3 days. In some circumstances, it may be acceptable for the treatment to take longer. For example, some wells are drilled and completed but then shut in for an extended time (of at least several weeks) before being put on production. The treatment fluid may therefore be left in the wellbore to remove filter cake during the extended shut in. The well will normally be shut in after introduction of the treatment fluid for a period, typically between 2 hours and a week, preferably 6-48 hours, to allow production of acid and breaking of the polymer. The well is then put on or returned to production, or in the case of injection wells, put on injection.

The treatment fluid may contain further materials or chemical additives such as are commonly used in the oil industry if their inclusion is deemed to be beneficial and if they are compatible with the other components of the treatment fluid.

Generally the treatment fluid will be aqueous, although in very high temperature formations, a suitable hydrocarbon or a mutual solvent may be used to reduce the rate of hydrolysis of the solid polymer.

The present invention has the following particular advantages over the prior art:

The process provides a simple, effective and convenient way to treat filter cake containing both carbonate and polymers using a single fluid.

Also the process is generally a very low hazard process compared to previous methods involving a substantive degree of acidising.

The components of the system are generally environmentally acceptable. The polyesters, enzymes and certain oxidant components such as the percarbonates are of low environmental impact. Also, the fluids are not highly corrosive, meaning that the use of corrosion inhibitors is generally not required which gives additional environmental benefits.

The invention will be further illustrated by the following examples:

EXAMPLE 1

1 g of polyglycolic acid powder was added to tubes containing 10 ml of water and 2 g of calcium carbonate (average particle size 50 microns). The tubes were capped and incubated at 25° C., 60° C. and 80° C. Calcium carbonate dissolution (due to glycolic acid liberated by hydrolysis of the polyglycolic acid) was monitored by taking samples of the aqueous fluid, separating particulate material by centrifugation and analyzing the soluble calcium using a colorimetric assay method.

The amount of calcium carbonate dissolved after 24 hours was 6, 20 and 40 g/l at 25° C., 60° C. and 80° C. respectively.

EXAMPLE 2

1 g of polylactic acid granules (average 2.5 mm diameter) was added to tubes containing 10 ml of water and 2 g of calcium carbonate (average particle size 50 microns). The tubes were capped and incubated at 80° C. and 95° C. Calcium carbonate dissolution (due to lactic acid liberated by hydrolysis of the polylactic acid) was monitored by taking samples of the aqueous fluid, separating particulate material by centrifugation and analyzing the soluble calcium using a colorimetric assay process.

The amount of calcium carbonate dissolved after 24 hours was 2.5 and 12.4 g/l at 80° C. and 95° C. respectively.

EXAMPLE 3

1.000 g of ground polylactic acid (average diameter 400 microns) was added to 75 ml of deionised water at placed in an Ofite high pressure high temperature (HPHT) cell. The cell was sealed and heated to 121 degrees C. After approximately 23 hours, 48 hours or 69 hours (three separate runs) the cell was opened and any un-dissolved material collected and air-dried to constant weight. The percentage of the initial PLA dissolved was then determined.

| Time at 121° C. (hours) | Percent PLA dissolved | pH of solution (by pH indicator strip) |
|---|---|---|
| 0 | 0 | |
| 23 | 60 | 3 |
| 48 | 98 | 2* |
| 69 | 100 | 2 |

*2.85 by pH meter

These results indicate that hydrolysis requires tens of hours at 121 degrees C. The low pH indicates that production of lactic acid is associated with the hydrolysis of the polylactic acid.

The Examples show that calcium carbonate is dissolved by acid produced from the hydrolysis of the solid polymers. They further show that the rate of acid production is a function of the composition of the polymer and the temperature. Organic acid production from polymers introduced into an underground formation will lead to disruption of carbonate containing filter cakes or other types of filter cake in contact with a carbonate formation.

The invention claimed is:

1. A process for disrupting filter cake in an underground formation, which process comprises:
   (i) dispersing in a treatment fluid particles consisting of a solid polymer capable of being converted by hydrolysis into one or more organic acids and incorporating into the treatment fluid one or more soluble polymer breakers, wherein said one or more soluble polymer breakers are selected from the group consisting of polysaccharide hydrolyzing enzymes, persulphates, perborates, percarbonates, perphosphates, hypochlorites and persilicates; then
   (ii) introducing the treatment fluid into said underground formation containing said filter cake; and
   (iii) allowing the solid polymer to hydrolyze in the presence of water to produce organic acid such that acid soluble material within the filter cake or adjacent formation is dissolved, and allowing the one or more soluble polymer breakers to degrade polymeric material that is present within the filter cake.

2. A process according to claim 1 wherein the solid polymer is a polyester.

3. A process according to claim 1 wherein the solid polymer is an aliphatic polyester.

4. A process according to claim 1 wherein the solid polymer is a polymer which comprises one or more compounds selected from the group consisting of lactic acid, lactide, glycolic acid, glycolide, caprolactone and other hydroxy, carboxylic acid and hydroxy-carboxylic acid compounds which may condense with a compound selected from the group consisting of lactic acid, lactide, glycolic acid, glycolide and caprolactone.

5. A process according claim 1 wherein hydrolysis of the solid polymer produces a compound selected from the group consisting of lactic acid and glycolic acid.

6. A process according claim 1 wherein the solid polymer is a solid polymer selected from the group consisting of polylactic acid and polyglycolic acid.

7. A process according to claim 1 wherein the solid polymer is used in a form selected from the group consisting of a sphere, cylinder, cuboid, fiber, powder and bead.

8. A process according to claim 1 which further comprises incorporating a buffer into the treatment fluid.

9. A process according to claim 1 wherein the one or more soluble polymer breakers is a polysaccharide hydrolyzing enzyme.

10. A process according to claim 1 wherein the polysaccharide hydrolyzing enzymes are selected from enzymes which can hydrolyze a polymer selected from the list consisting of starch, xanthan, cellulose, guar, scleroglucan, succinoglycan and a derivative of any one of these polymers.

11. A process according to claim 1 wherein the one or more soluble polymer breakers are selected from the group consisting of persulphate, hypochlorite, perborate, percarbonate, perphosphate, and persilicate.

12. A process according to claim 1 wherein the one or more polymer breakers are in the form of a delayed release preparation.

13. A process according to claim 1 wherein the treatment fluid is a gravel packing fluid which comprises one or more solid polymers and one or more polymer breakers.

14. A process according to claim 1 wherein the treatment fluid disrupts or degrades at least a portion of the filter cake and increases the permeability of the formation.

15. A process according to claim 1 wherein at least a portion of the solid polymer remains in the underground formation and continuously releases organic acid and a production chemical during hydrocarbon production or water injection until the solid polymer has completely hydrolyzed.

16. A process according to claim 1 wherein the underground formation contains hydrocarbon or water and wherein the process further comprises recovering a hydrocarbon or water from the treated formation.

17. A process according to claim 1 wherein the treatment fluid containing the solid polymer is introduced into the formation via a well bore which extends to the formation.

18. A process according to claim 1 wherein the treatment fluid further comprises an acid sensitive viscosifying agent and wherein the viscosity of the fluid is reduced by the acid generated by hydrolysis of the solid polymer.

19. A process according to claim 18 wherein the viscosifying agent is borate crosslinked guar gum.

20. A process according to claim 1 wherein the treatment fluid further comprises calcium peroxide and wherein the organic acid produced by hydrolysis of the solid polymer leads to the generation of hydrogen peroxide.

21. A process according to claim 1 wherein the treatment fluid further comprises ammonium bifluoride and wherein the organic acid produced by hydrolysis of the solid polymer leads to the generation of hydrogen fluoride.

22. A process according to claim 1 wherein the solid polymer is a polymer which comprises one or more compounds selected from the group consisting of lactic acid, lactide, glycolic acid, glycolide and caprolactone.

23. A process according to claim 1 wherein the treatment fluid is a gravel packing fluid which comprises one or more solid polymers.

* * * * *